US011128665B1

(12) United States Patent
Sokolov et al.

(10) Patent No.: US 11,128,665 B1
(45) Date of Patent: Sep. 21, 2021

(54) SYSTEMS AND METHODS FOR PROVIDING SECURE ACCESS TO VULNERABLE NETWORKED DEVICES

(71) Applicant: Symantec Corporation, Mountain View, CA (US)

(72) Inventors: Ilya Sokolov, Boston, MA (US); Bruce McCorkendale, Manhattan Beach, CA (US)

(73) Assignee: NortonLifeLock Inc., Tempe, AZ (US)

( * ) Notice: Subject to any disclaimer, the term of this patent is extended or adjusted under 35 U.S.C. 154(b) by 388 days.

(21) Appl. No.: 16/123,622

(22) Filed: Sep. 6, 2018

(51) Int. Cl.
H04L 29/06 (2006.01)

(52) U.S. Cl.
CPC .......... *H04L 63/20* (2013.01); *H04L 63/0272* (2013.01); *H04L 63/0281* (2013.01); *H04L 63/1408* (2013.01); *H04L 63/1433* (2013.01)

(58) Field of Classification Search
CPC . H04L 63/20; H04L 63/1433; H04L 63/0281; H04L 63/0272; H04L 63/1408
See application file for complete search history.

(56) References Cited

U.S. PATENT DOCUMENTS

| 9,985,984 B1* | 5/2018 | Chavez | H04L 61/2503 |
| 2007/0169184 A1* | 7/2007 | Krywaniuk | H04L 63/0281 |
| | | | 726/11 |
| 2014/0181977 A1* | 6/2014 | Hammond | H04L 63/1458 |
| | | | 726/23 |
| 2016/0006754 A1* | 1/2016 | Woodward | H04L 63/1408 |
| | | | 726/23 |
| 2016/0028749 A1* | 1/2016 | Murynets | H04L 63/1408 |
| | | | 726/22 |
| 2016/0044054 A1* | 2/2016 | Stiansen | H04L 63/1416 |
| | | | 726/24 |
| 2016/0283713 A1* | 9/2016 | Brech | G06F 9/45558 |
| 2018/0260574 A1* | 9/2018 | Morello | G06F 21/577 |
| 2019/0058697 A1* | 2/2019 | Chang | H04L 9/3247 |

* cited by examiner

*Primary Examiner* — Michael R Vaughan
(74) *Attorney, Agent, or Firm* — FisherBroyles, LLP

(57) ABSTRACT

The disclosed computer-implemented method for providing secure access to vulnerable networked devices may include identifying a vulnerable network device connected to a local network, identifying local network traffic destined for the vulnerable network device and that has been tagged as safe, passing the local network traffic tagged as safe to the vulnerable network device, and performing a security action on local network traffic destined for the vulnerable network device that has not been tagged as safe. Various other methods, systems, and computer-readable media are also disclosed.

18 Claims, 7 Drawing Sheets

SYSTEMS AND METHODS FOR PROVIDING SECURE ACCESS TO VULNERABLE NETWORKED DEVICES

BACKGROUND

Smart devices are becoming increasingly ubiquitous in every aspect of modern life. Some of these devices, which may be referred to as internet of things (IOT) devices, include smart thermostats, smart power plugs, smart light bulbs, etc., may form a local smart home ecosystem with multiple devices the work together to provide a variety of functions. For example, a smart refrigerator may order groceries online when it is nearly empty, a smart power plug may turn off lights when someone leaves a building, or a smart thermostat may adjust the set temperature when someone leave the premises.

These IOT devices may introduce vulnerabilities not commonly associated with traditional computing devices. For example, IOT devices are often designed to interact with a counterpart device, such as a web server, to provide a user interface. If the web server software is not updated regularly, it may be exploited by a malicious user or malicious software. Conventionally, a home network may mitigate the risk by segregating devices and/or blocking network ports. However, such conventional techniques may render an IOT device useless and may result in a user disabling the security feature in order to use the IOT device. The instant disclosure, therefore, identifies and addresses a need for systems and methods for providing secure access to vulnerable networked devices.

SUMMARY

As will be described in greater detail below, the instant disclosure describes various systems and methods for providing secure access to vulnerable networked devices.

In one example, a method for providing secure access to vulnerable networked devices may include identifying a vulnerable network device connected to a local network, identifying local network traffic destined for the vulnerable network device and that has been tagged as safe, passing the local network tagged as safe to the vulnerable network device, and performing a securing action on local network traffic destined for the vulnerable network device that has not been tagged as safe.

In another example, the method may further include identifying an application executing on a device connected to the network as a safe application, identifying the network traffic originating from the application, and tagging the network traffic as safe based on the identity of the safe application and the destination of the network traffic. In some embodiments, a device may perform the steps of identifying an application as a safe application, identifying the network traffic originating from the application, and tagging the network traffic as safe. In some embodiments, the steps of identifying an application as a safe application, identifying the network traffic originating from the application, and tagging the network traffic as safe are performed external to the device.

In some examples, identifying an application as a safe application may involve a device monitoring network traffic by way of at least one of a filter network driver, a system call, a usability application, establishing a virtual private network, or by acting a proxy server.

In another example, the method may further include identifying a user generating the network traffic destined for the vulnerable network device and tagging the traffic as safe is further based on the identified user generating the network traffic. Additionally or alternatively, the method may include verifying a validity of the network traffic tagged as safe using a public key.

In some embodiments, the method may further include prompting an administrator for authorization to tag network traffic originating from a local source and destined for the vulnerable network device as safe, receiving authorization from the administrator to tag the network traffic originating from the local source and destined for the vulnerable network device as safe, and tagging the network traffic originating from the local source and destined for the unprotected device as safe. In some examples, the method may further include maintaining a record of the authorization from the administrator and tagging future network traffic originating from the local source and destined for the unprotected device as safe without prompting the administrator for further authorization.

In one example, a system for providing secure access to vulnerable networked devices may include at least one physical processor and physical memory that includes computer-executable instructions that, when executed by the physical processor, cause the physical processor to identify a vulnerable network device connected to a local network, identify local network traffic destined for the vulnerable network device and that has been previously tagged as safe, pass the local network traffic that has been previously tagged as safe to the vulnerable network device, and perform a security action on local network traffic destined for the vulnerable network device that has not been tagged as safe.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to identify a vulnerable network device connected to a local network, identify local network traffic destined for the vulnerable network device and that has been previously tagged as safe, pass the local network traffic that has been previously tagged as safe to the vulnerable network device, and perform a security action on local network traffic destined for the vulnerable network device that has not been tagged as safe.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
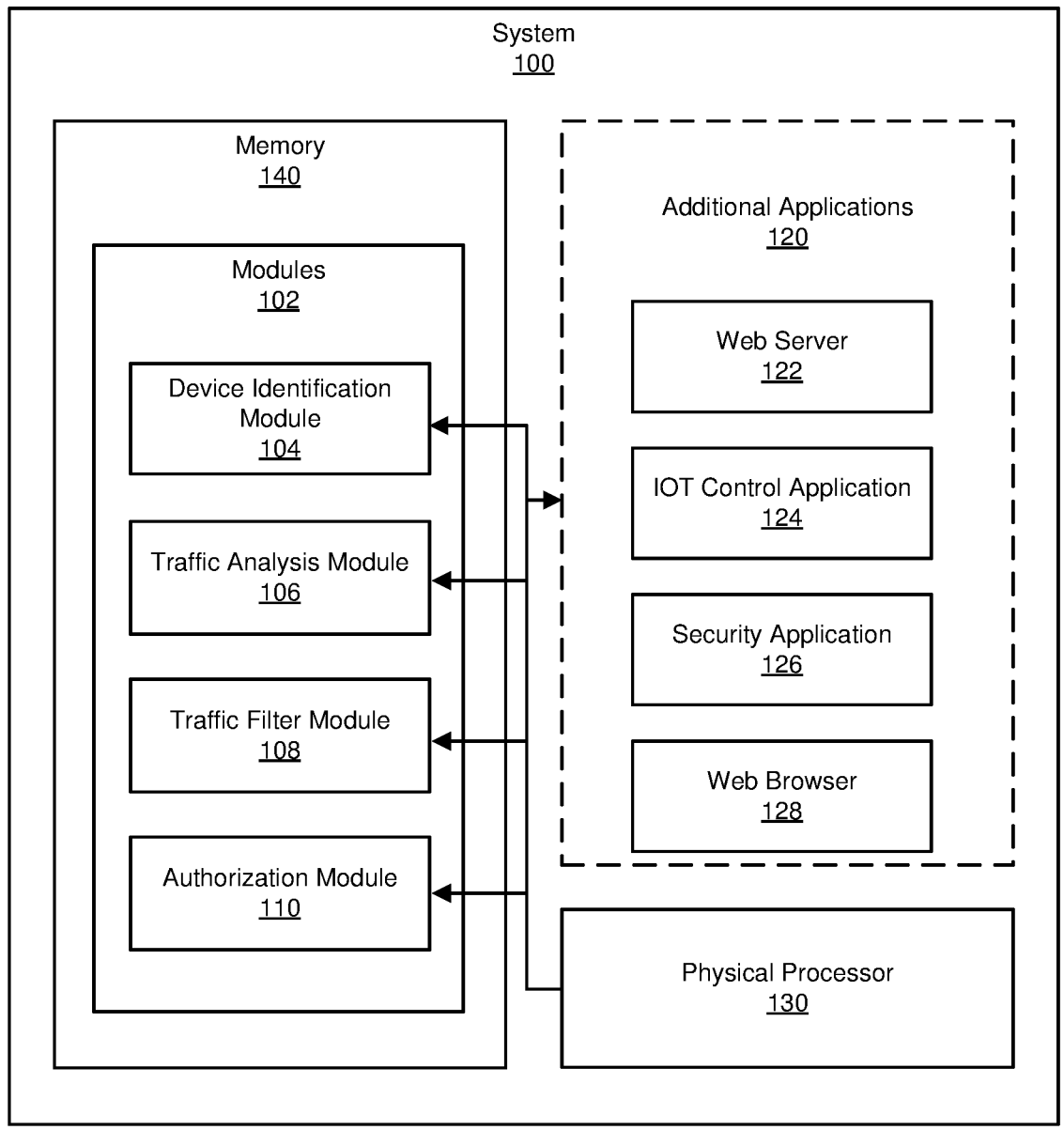
FIG. 1 is a block diagram of an example system for providing secure access to vulnerable networked devices.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing secure access to vulnerable networked devices. As will be explained in greater detail below, by tagging a network packet as safe, the systems and methods described herein may able to provide secure access to vulnerable network devices by performing a security action on packets not tagged as safe while allowed tagged packets to pass to the vulnerable network device. Recognizing network traffic as safe through the systems and methods described herein may reduce the risk of malicious users or software compromising the vulnerable network device.

The systems and methods described herein may improve the functioning of a home ecosystem by allowing vulnerable network devices to be accessed/controlled by a local counterpart while protecting against unauthorized access for malicious purposes. Thus, there may be a reduced risk of the vulnerable network device being compromised and used for malicious purposes. Furthermore, the systems and methods improve the user experience with the security aspects of the local home ecosystem which may result in a greater use of the security aspects and therefore an improved home ecosystem.

Figure 2:
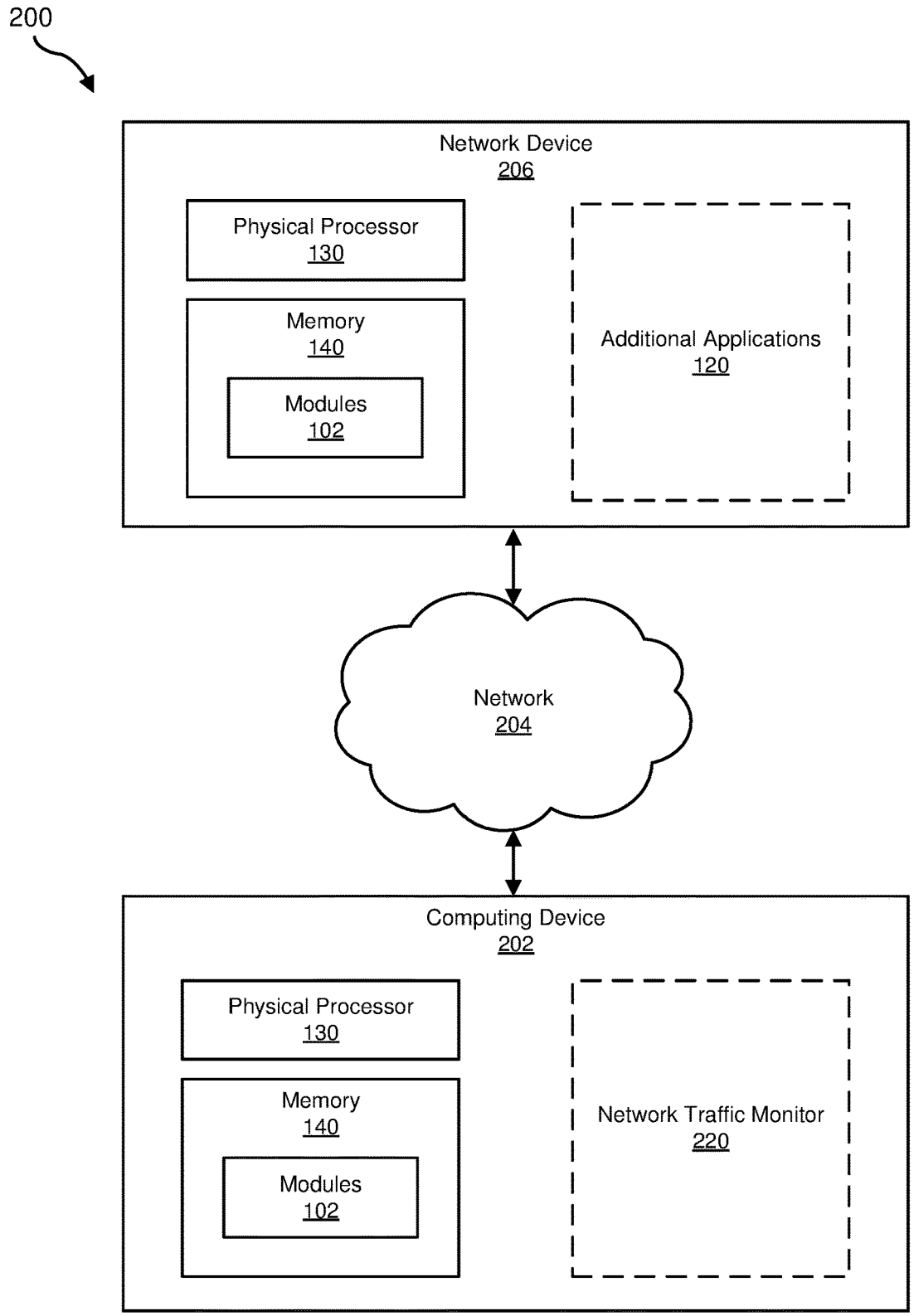
FIG. 2 is a block diagram of an additional example system for providing secure access to vulnerable networked devices.

The following will provide, with reference to FIGS. 1-2, detailed descriptions of example systems for providing secure access to vulnerable networked devices. Detailed descriptions of a local network will be provided in connection with FIG. 4. Detailed descriptions of corresponding computer-implemented methods will also be provided in connection with FIG. 4. FIG. 5 a detailed description of a network packed suitable for use with the embodiments described herein. In addition, detailed descriptions of an example computing system and network architecture capable of implementing one or more of the embodiments described herein will be provided in connection with FIGS. 6 and 7, respectively.

FIG. 1 is a block diagram of an example system 100 for providing secure access to vulnerable networked devices. As illustrated in this figure, example system 100 may include one or more modules 102 for performing one or more tasks. As will be explained in greater detail below, modules 102 may include a device identification module 104, a traffic analysis module 106, a traffic filter module 108, and an authorization module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or network device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing secure access to vulnerable networked devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional applications 120. In some examples, additional applications 120 may include, without limitation, a web server 122, a IOT control application 124, a security application 126, or a web browser 128.

Example system 100 in FIG. 1 may be implemented in a variety of ways. For example, all or a portion of example system 100 may represent portions of system 200 in FIG. 2. As shown in FIG. 2, system 200 may include a computing device 202 in communication with a network device 206 via a network 204. In one example, all or a portion of the functionality of modules 102 may be performed by computing device 202, network device 206, and/or any other suitable computing system. As will be described in greater detail below, one or more of modules 102 from FIG. 1 may, when executed by at least one processor of computing device 202 and/or network device 206, enable computing device 202 and/or network device 206 to provide secure access to vulnerable networked devices. For example, and as will be described in greater detail below, one or more of modules 102 may cause computing device 202 and/or network device 206 to identify the computing device 202, identify local network traffic destined for a local vulnerable networked device that has been tagged as safe, pass the local network traffic tagged as safe to the vulnerable networked device, and perform a security action on local network traffic destined for the vulnerable networked device that has not been tagged as safe.

Computing device 202 generally represents any type or form of computing device capable of reading computer-executable instructions. In one example, computing device is a smart phone configured to interactant with the vulnerable networked device. For example, the smart phone may have IOT control application 124 associated with a vulnerable networked device that communicates with the vulnerable networked device. Or in other examples, computing device 202 may use generic software such as web browser 128 to interact with a service application of the vulnerable networked device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network device 206 generally represents any type or form of computing device that is capable of managing network traffic between connected computing devices. In one example, network device 206 is a router. Additional examples of network device 206 include, without limitation, switches, gateways, servers, security servers, application servers, web servers, storage servers, and/or database servers configured to run certain software applications and/or provide various security, web, storage, and/or database services. Although illustrated as a single entity in FIG. 2, network device 206 may include and/or represent a plurality of devices that work and/or operate in conjunction with one another.

Network 204 generally represents any medium or architecture capable of facilitating communication or data transfer. In one example, network 204 may facilitate communication between computing device 202 and network device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Optional security application 220 may include a network traffic monitor. Network traffic monitor generally represents any type or form of application capable of monitoring and analyzing network traffic exiting computing device 202. Examples of network traffic monitor include, without limitation, a filter network driver a usability application on the computing device 202, or a virtual private network client receiving all local network traffic.

Figure 3:
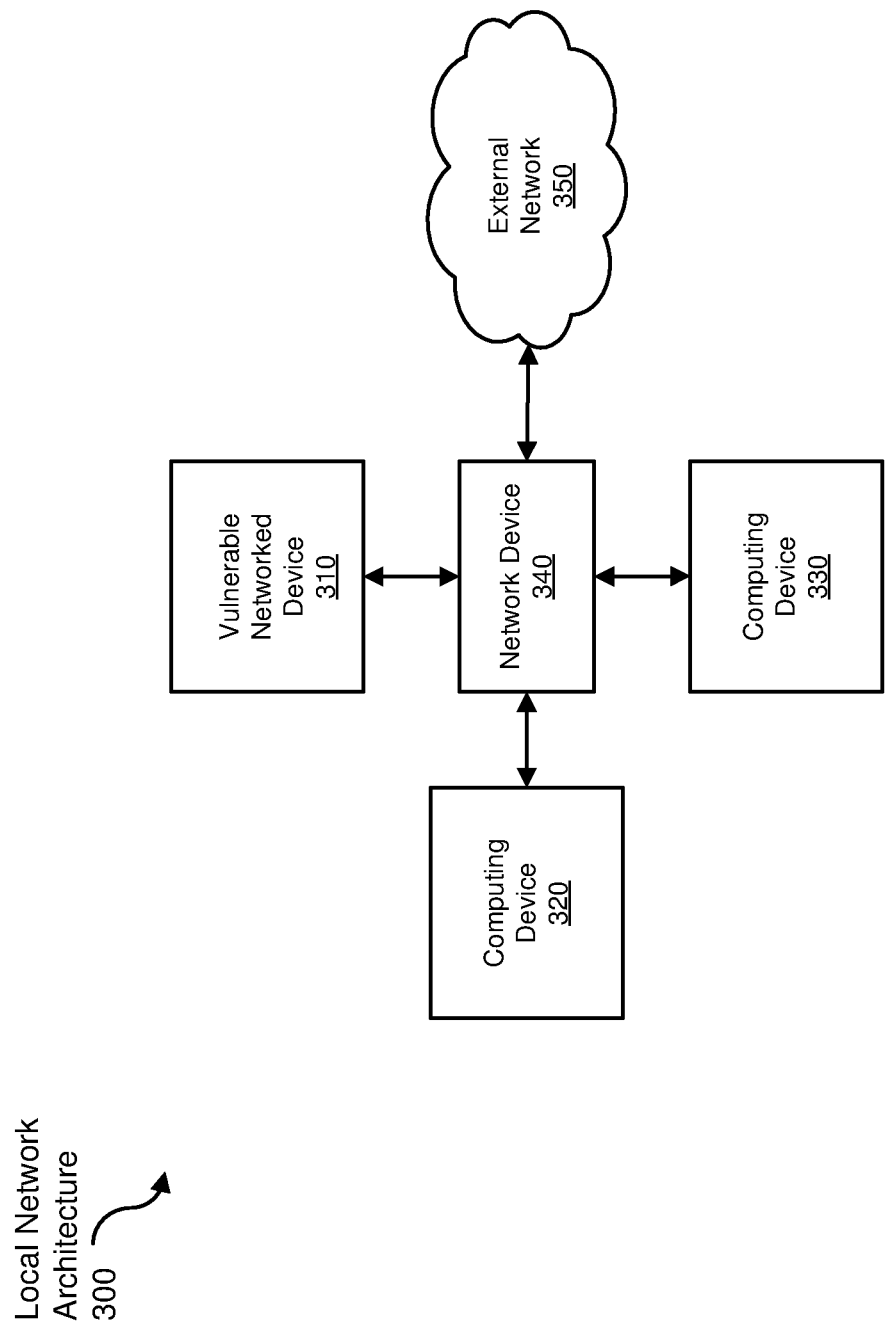
FIG. 3 is a block diagram of a local network capable of implementing one or more of the embodiments described and/or illustrated herein.

FIG. 3 is an example of a local network architecture 300 including a vulnerable networked device 310, a first computing device 320, a second computing device 330, a network device 340, and an external network 350. Vulnerable networked device 310, first computing device 320, and second computing device 330 may each be implemented, for example as instances of computing device 202 of FIG. 2, and network device 340 may be implemented as an instance of network device 206 of FIG. 2. Additionally, while only a single vulnerable networked device 310 is illustrated, it will be understood that the described embodiments are applicable to network architecture 300 have a greater number of vulnerable networked devices. Similarly, while only two computing devices 320, 330 are illustrated, it will be understood that the described embodiments are application to local network architectures having a greater number of computing devices. Vulnerable networked device 310, first computing device 320, and second computing device 330 may each be connected to network device 340 by way of a local communication network. Network device 340 may be operable to monitor and control network traffic flowing between vulnerable networked device 310, first computing device 320, and second computing device 330, and external traffic to external network 350.

Figure 4:
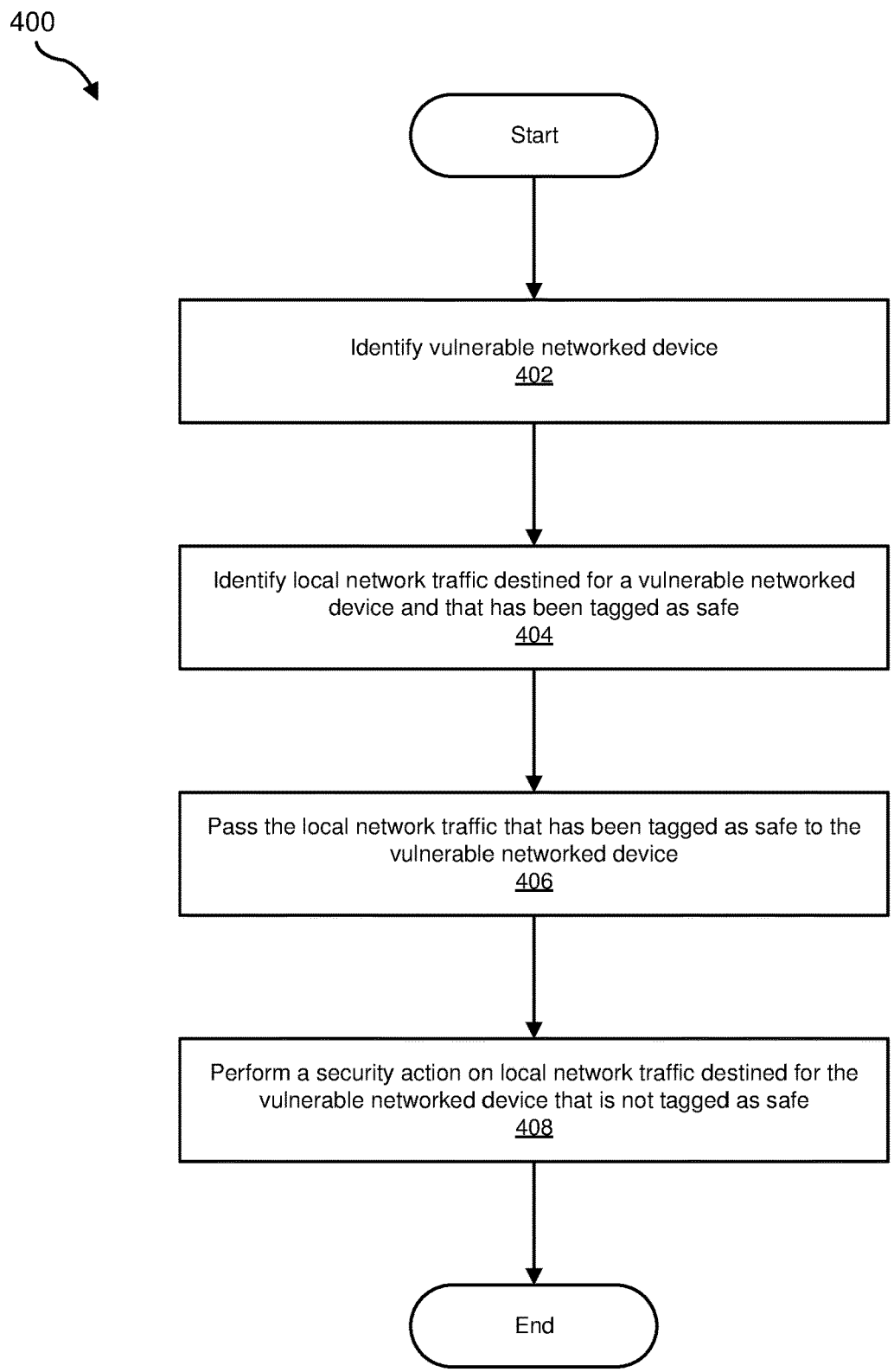
FIG. 4 is a flow diagram of an example method for providing secure access to vulnerable networked devices.
Figure 5:
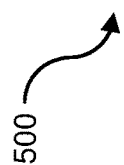
FIG. 5 is an example of a packet header suitable for use in one or more of the embodiments described herein.

FIG. 4 is a flow diagram of an example computer-implemented method 400 for providing secure access to vulnerable networked devices. The steps shown in FIG. 4 may be performed by any suitable computer-executable code and/or computing system, including example system 100 in FIG. 1, system 200 in FIG. 2, and/or variations or combinations of one or more of the same as shown in local network architecture 300 of FIG. 3. In one example, each of the steps shown in FIG. 3 may represent an algorithm whose structure includes and/or is represented by multiple sub-steps, examples of which will be provided in greater detail below.

As illustrated in FIG. 4, at step 402 one or more of the systems described herein may identify a vulnerable networked device. For example, device identification module 104 may, as part of example system 100 in FIG. 1, identify a vulnerable networked device, such as vulnerable networked device 310. Device identification module 104 may identify the vulnerable networked device 310 without user interaction, or in some examples a user may manually identify a device as being vulnerable.

The term "vulnerable networked device," as used herein, generally refers to a computing device connected to a local network that has a potential security vulnerability identified by either a user, the manufacturer, or a third-party security party. Examples of vulnerable networked devices include, without limitation IOT devices, smart televisions, smart thermostats, smart power outlets, smart security systems, and smart appliances.

The systems described herein may perform step 402 in a variety of ways. In one example, network device 340 may receive a notification from a device, such as first computing device 320, that the device has installed a management application for a known vulnerable networked device. For example, first computing device 320 may install a management application, such as IOT control application 124, for management of an IOT device. As part of the process, first computing device 320 may send a notification to network device 340 identifying the vulnerable networked device. For example, security application 126 executing at first computing device 320 may detect the installation of IOT control application 124 and the associated IOT device.

In another example, network device 340 may detect the presence of vulnerable networked device 310. For example, network device 340 may recognize a media access control (MAC) address of vulnerable networked device 310 as being consistent with a manufacturer of potentially vulnerable networked device. In another example, network device 340 may recognize a network traffic pattern that is particular to a known vulnerable networked device. For example, a smart thermostat may regularly attempt to contact an external server at a known address using a known network port. In another example, network device 340 may identify a network device through an interaction with a user. A user may interact with a user interface, such as web server 122, of network device 340 and manually identify a connected device as vulnerable networked device 310.

As illustrated in FIG. 4, at step 404, one or more of the systems described herein may identify local network traffic destined for vulnerable networked device 310 and that has been tagged as safe. For example, traffic analysis module 106 may, as part of example system 100, analyze network traffic to determine its origination and its destination, as well as the presence of any tags. If traffic analysis module 106 determines that the network traffic is destined for vulnerable networked device 310 and is tagged as safe, it may identify the traffic as safe.

The term "tag" as used herein, generally refers to marking network traffic with an identifier that can later be used to identify the network traffic for use in filtering and translation. The tag may be applied at network traffic at varying levels, including, without limitation, as a virtual local area network tag associated an ethernet frame or as an option within an internet protocol (IP) header. FIG. 5 illustrates an example of an IP version 4 (IPv4) packet header 500 suitable for use with the described embodiments. In one example, an options field 502 in the header may be used to tag an IP packet. In some examples, the tag may be signed using a public key to verify the authenticity of the tag.

The systems described herein may perform step 404 in a variety of ways. In one example, network device 340 may receive network traffic from a device, such as first computing device 320, and access a packet header identifying the destination of the packet. If the packet is destined for the vulnerable networked device, the network device may further determine if the packet has been tagged as safe. In one example, network device 340 may access IPv4 header 500 of IP packet, determine if the destination IP address 504 corresponds to an address of a vulnerable networked device, and check the header for a tag. In some examples, network device 340 may further verify the authenticity of the tag by verifying a signature.

As illustrated in FIG. 4, at step 406 one or more of the systems described herein may pass the local network traffic tagged as safe to the vulnerable networked device. For example, traffic filter module 108 may, as part of example system 100, forward the network traffic to a vulnerable networked device such as vulnerable networked device 310. The systems described herein may perform step 406 in a variety of ways. In one example, network device 340 may receive forward a network packet tagged as safe to vulnerable networked device 310.

As illustrated in FIG. 4, at step 408 one or more of the systems described herein may perform a security action on local traffic destined for the vulnerable networked device that has not been tagged as safe. For example, traffic filter module 108 may, as part of example system 100, perform a security action on network traffic. The term "security action," as used herein, generally refers to an action taken on the network traffic to implement a security policy. Example of security actions include, without limitation, dropping the network traffic, rejecting the network traffic, redirecting the network traffic, and logging the network traffic. In one example, a security action may include a remediation action such as initiating a security scan on the device generating the network traffic, causing a scan of the network to check for malware, etc. The systems described herein may perform step 408 in a variety of ways. In one example, network device 340 may drop, redirect, or reject all network packets destined for vulnerable networked device 310 that have not been tagged as safe. In some examples, network device 340 may perform a security action on any network traffic that is unable to verify the authenticity of the tag, such as through a signature. In another example, network device 340 may further log the network traffic that was dropped, redirected, or rejected by the network device.

In some embodiments, the computer-implemented method 400 may further include steps of identifying an application executing on a device connected to the local network as a safe application, identifying network traffic originating from the safe application and destined for the vulnerable networked device as safe, and tagging the network traffic as safe based on the identity of the safe application and the destination of the network traffic.

One or more of the systems described herein may implement the step of identifying an application executing on a device connected to the local network as a safe application. In one example, computing device 202 may include a security application 220 executing on computing device 202 that may observe network traffic from various applications executing on computing device 202. Security application 220 may identify a processes or application that is creating or requesting network connections using conventional techniques. For example, without limitation, security application may install a filter network driver to observe local network traffic, may enumerate system resources using system calls (e.g. using sysctl call on IOS), may install itself as a usability application on the computing device 202, or may act as a virtual private network client such that all local network traffic will pass through it.

In another example, network device 206 may determine what application is generating traffic on computing device 202. For example, network device 206 may compare network traffic originating from computing device 202 with known request data (e.g. headers in HTTP traffic, protocol recognition, and authentication requests to application's identity provider, activation calls etc.) from known applications and determine whether traffic originating from computing device 202 is consistent with any known applications. If enough historic data is available, network device 206 may identify the application as being safe.

One or more of the systems described herein may implement the step of identifying network traffic originating from the safe application and destined for the vulnerable networked device as safe traffic. In one example, computing device 202 may include a security application 220 executing on computing device 202 that may observe network traffic originating from an application identified as safe and destined for vulnerable networked device. Security application 220 may identify the destination of network traffic using conventional techniques. For example, without limitation, security application may install a filter network driver to observe local network traffic, may enumerate system resources using system calls (e.g. using sysctl call on IOS), may install itself as a usability application on the computing device 202, or may act as a virtual private network client such that all local traffic will pass through it.

In another example, network device 206 may identify the destination of network traffic originating from a safe application on computing device 202. For example, network device 206 may analyze network data from a previously identified safe application to determine if it is being sent to a known vulnerable networked device. In some examples, the identification of a safe application and the identification of the network traffic may be done in combination through a comparison of traffic originating from the computing device with known request data (e.g. headers in HTTP traffic, protocol recognition, and authentication requests to application's identity provider, activation calls etc.) from known applications and determine whether traffic originating from the computing device is consistent with any known applications. If enough historic data is available, network device 206 may identify the traffic as safe.

In another example, network device 206 or computing device 202 may prompt an administrator to authorize network traffic as safe. For example, an administrator associated with a security application 126, may receive a notification of an application attempting to communicate with vulnerable networked device 310. The administrator may then manually perform an action, such as adding the traffic to a whitelist to tag it as safe or blacklist the traffic. Such decisions may be stored for future reference so that the security application may tag future network traffic without further user interaction.

In some examples, authorization module 110 may be used to verify an identity of an individual. For example, authorization module 110 may identify a user generating the network traffic. Identifying network traffic as safe may then be further based on not only the identification of a safe application and the destination of the network traffic but may be further based on the identification of the user generating the traffic. For example, a first user may be authorized to interact with a smart application, while a second user or an unauthenticated user may not. In this example, only traffic from a safe application destined for the vulnerable networked device that originates from the first authenticated user would be tagged as safe, while other traffic would be untagged.

One or more of the systems described herein may implement the step of tagging the network traffic as safe based on the identity of the safe application and the destination of the network traffic. In one example, computing device 202 may include a security application 220 executing on computing device 202 that may tag traffic identified as originating from an application identified as safe and destined for a vulnerable networked device. Computing device may tag the traffic using conventional techniques including, without limitation, manipulating a packet header to include a tag, adding a public signature, or other method of marking the network traffic.

In another example, network device 340 may be responsible for tagging network traffic as safe. For example, network device 340 may, as part of analysis of traffic in identifying a safe application and identifying traffic destined for a vulnerable networked device, may tag the traffic as safe traffic. Network device 340 may tag the traffic as safe using conventional techniques including, without limitation, manipulating a packet header to include a tag, adding a public signature, or other method of marking the network traffic.

As explained above in connection with example computer-implemented method 400 in FIG. 4, the described systems and methods may protect a vulnerable networked device from potentially harmful interactions while still allowing appropriate interactions with local users. For example, a verified control application may interact with a smart appliance without limitation. However, an attempt to interact with the smart appliance from the same device may be blocked if the application is not identified as a safe application. Thus, the vulnerable networked device may be able to communicate with a device and application that has a valid purpose for communicating with the vulnerable networked device, while all other traffic that may not be safe is blocked.

Figure 6:
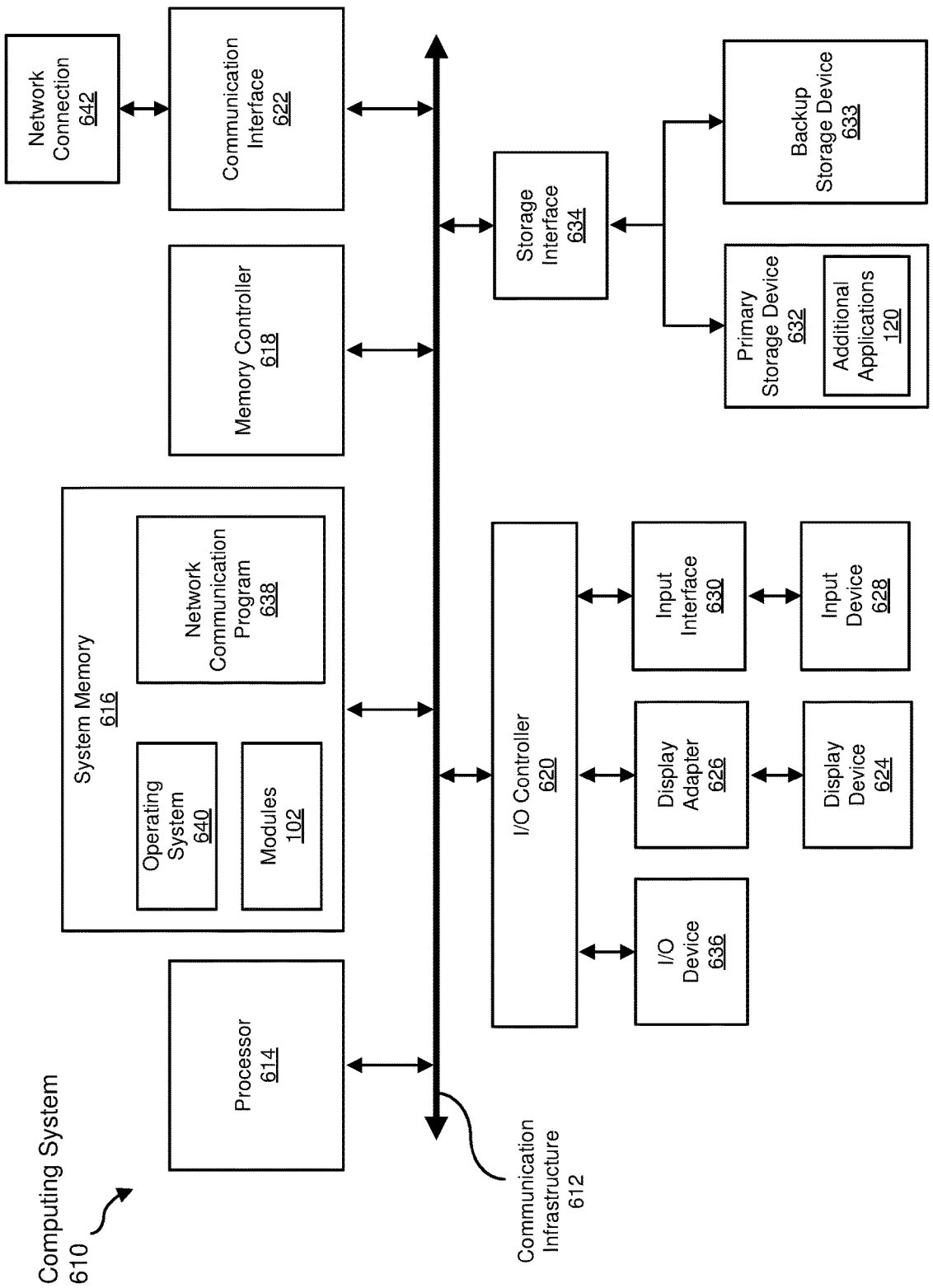
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one example, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional applications 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
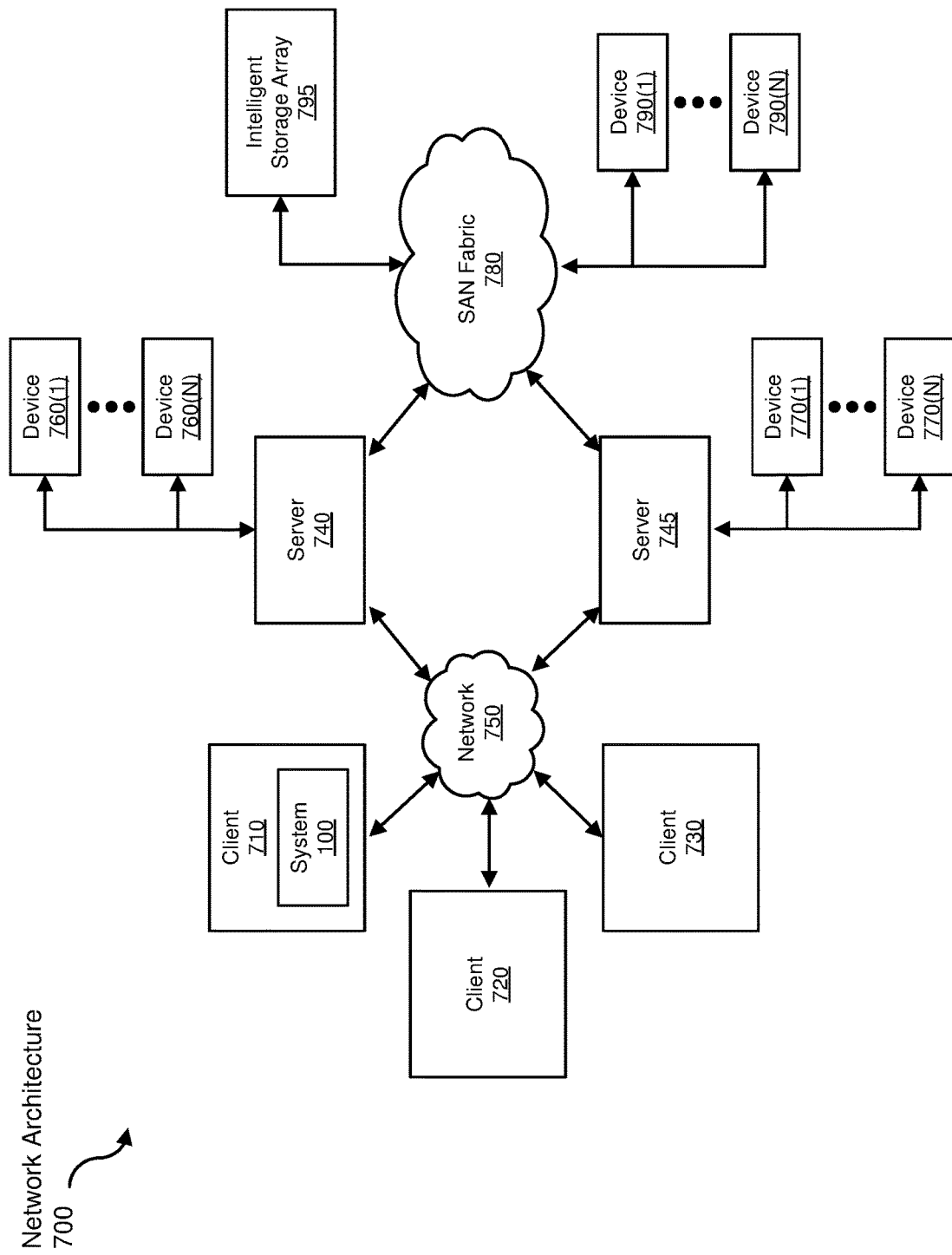
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of example system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for providing secure access to vulnerable networked devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing secure access to vulnerable networked devices, at least a portion of the method being performed by a computing device comprising at least one processor, the method comprising:
   identifying a vulnerable networked device connected to a local network;
   identifying an application executing on a device connected to the local network as a safe application;
   identifying a first portion of local network traffic originating from the safe application and destined for the vulnerable networked device;
   tagging the first portion of local network traffic as safe based on the identity of the safe application and the destination of the first portion of local network traffic, wherein the tagging includes marking the first portion of local network traffic with an identifier;
   identifying the first portion of local network traffic destined for the vulnerable networked device and that has been tagged as safe;
   passing the first portion of local network traffic tagged as safe to the vulnerable networked device; and
   performing a security action on a second portion of local network traffic destined for the vulnerable networked device that has not been tagged as safe,
   wherein the steps of identifying the application as a safe application, identifying the network traffic originating from the application, and tagging the network traffic as safe are performed external to the device.

2. The computer-implemented method of claim 1, wherein the identifier corresponds to at least one of:
   a virtual local area network tag associated with an ethernet frame; or
   an options field within an internet protocol (IP) header.

3. The computer-implemented method of claim 1, wherein identifying an application as a safe application comprises monitoring network traffic by way of at least one of a filter network driver, a system call, a usability application, establishing a virtual private network, or by acting as a proxy server.

4. The computer-implemented method of claim 1, further comprising:
   identifying a user generating the network traffic destined for the vulnerable networked device; and
   wherein tagging the network traffic as safe is further based on the identified user generating the network traffic.

5. The computer-implemented method of claim 1, further comprising verifying a validity of the tagged network traffic with a public key.

6. The computer-implemented method of claim 1, further comprising:
   prompting an administrator for authorization to tag network traffic originating from a local source and destined for the vulnerable networked device as safe;
   receiving authorization from the administrator to tag the network traffic originating from the local source and destined for the vulnerable networked device as safe; and
   tagging the network traffic originating from the local source and destined for the vulnerable networked device as safe.

7. The computer-implemented method of claim 6, further comprising maintaining a record of the authorization from the administrator and tagging future network traffic originating from the local source and destined for the vulnerable networked device without prompting the administrator for further authorization.

8. A system for providing secure access to vulnerable networked devices, the system comprising:
   at least one physical processor;
   physical memory comprising computer-executable instructions that, when executed by the physical processor, cause the physical processor to:
      identify a vulnerable network device connected to a local network;
      identify an application executing on a device connected to the local network as a safe application;
      identify a first portion of local network traffic originating from the safe application and destined for the vulnerable networked device;
      tag the first portion of local network traffic as safe based on the identity of the safe application and the destination of the first portion of local network traffic, wherein the instructions cause the physical processor to mark the first portion of local network traffic with an identifier;
      identify the first portion of local network traffic destined for the vulnerable network device and that has been previously tagged as safe;
      pass the first portion of local network traffic that has been previously tagged as safe to the vulnerable network device; and
      perform a security action on a second portion of local network traffic destined for the vulnerable network device that has not been tagged as safe,
      wherein the instructions cause the physical processor to identify the application as a safe application, identify the network traffic originating from the application, and tag the network traffic as safe external to the device.

9. The system of claim 8, wherein the identifier corresponds to at least one of:
   a virtual local area network tag associated with an ethernet frame; or
   an options field within an internet protocol (IP) header.

10. The system of claim 8, wherein the computer-executable instructions further cause the physical processor to:
    identify a user generating the network traffic destined for the vulnerable network device; and
    wherein tagging the network traffic as safe is further based on the identified user generating the network traffic.

11. The system of claim 8, wherein the computer-executable instructions further cause the physical processor to:

prompt an administrator for authorization to tag network traffic originating from a local source and destined for the vulnerable network device as safe;

receive authorization from the administrator to tag the network traffic originating from the local source and destined for the vulnerable network device as safe; and tag the network traffic originating from the local source and destined for the vulnerable network device as safe.

12. The system of claim 11, wherein the computer-executable instructions further cause the physical processor to:

maintain a record of the authorization from the administrator, and tag future network traffic originating from the local source and destined for the vulnerable network device without prompting the administrator for further authorization.

13. The system of claim 8, wherein the computer-executable instructions further cause the physical processor to:

verify a validity of the tagged network traffic with a public key.

14. A non-transitory computer-readable medium comprising one or more computer-executable instructions that, when executed by at least one processor of a computing device, cause the computing device to:

identify a vulnerable network device connected to a local network;

identify an application executing on a device connected to the local network as a safe application;

identify a first portion of local network traffic originating from the safe application and destined for the vulnerable networked device;

tag the first portion of local network traffic as safe based on the identity of the safe application and the destination of the first portion of local network traffic, wherein the instructions cause the computing device to mark the first portion of local network traffic with an identifier;

identify the first portion of local network traffic destined for the vulnerable network device and that has been previously tagged as safe;

pass the first portion of local network traffic that has been previously tagged as safe to the vulnerable network device; and perform a security action on a second portion of local network traffic destined for the vulnerable network device that has not been tagged as safe, wherein the instructions cause the computing device to identify the application as a safe application, identify the network traffic originating from the application, and tag the network traffic as safe external to the device.

15. The non-transitory computer-readable medium of claim 14, wherein the identifier corresponds to at least one of:

a virtual local area network tag associated with an ethernet frame; or an options field within an internet protocol (IP) header.

16. The non-transitory computer-readable medium of claim 14, wherein the computer-executable instructions further cause the computing device to:

identify a user generating the network traffic destined for the network device; and wherein tagging the network traffic as safe is further based on the identified user generating the network traffic.

17. The non-transitory computer-readable medium of claim 16, wherein the computer-executable instructions further cause the processor to:

prompt an administrator for authorization to tag network traffic originating from a local source and destined for the vulnerable network device as safe;

receive authorization from the administrator to tag the network traffic originating from the local source and destined for the vulnerable network device as safe; and tag the network traffic originating from the local source and destined for the vulnerable network device as safe.

18. The non-transitory computer-readable medium of claim 17, wherein the computer-executable instructions further cause the processor to:

maintain a record of the authorization from the administrator, and tag future network traffic originating from the local source and destined for the vulnerable network device without prompting the administrator for further authorization.

* * * * *